United States Patent [19]

Gregory

[11] Patent Number: 4,908,435

[45] Date of Patent: Mar. 13, 1990

[54] AROMATIC DISAZO COMPOUNDS HAVING STRONG INFRA-RED ABSORPTION

[75] Inventor: Peter Gregory, Bolton, England

[73] Assignee: Imperial Chemical Industries PLC, London, England

[21] Appl. No.: 158,233

[22] Filed: Feb. 12, 1988

[30] Foreign Application Priority Data

Feb. 27, 1987 [GB] United Kingdom ............... 8704727

[51] Int. Cl.$^4$ .................. C09B 31/02; C09B 31/04; C09B 31/14; D06P 1/18
[52] U.S. Cl. .................................. 534/761; 534/753; 534/757; 534/765; 534/887; 534/735
[58] Field of Search ................. 534/761, 757, 735

[56] References Cited

U.S. PATENT DOCUMENTS

| | | | |
|---|---|---|---|
| 4,124,581 | 11/1978 | Vor Der Bruck et al. | 534/757 X |
| 4,180,503 | 12/1979 | Vor Der Bruck et al. | 534/761 |
| 4,207,233 | 6/1980 | Seybold et al. | 534/757 X |
| 4,621,136 | 11/1986 | Imahori et al. | 534/761 |
| 4,760,133 | 7/1988 | Niwa et al. | 534/761 X |

FOREIGN PATENT DOCUMENTS

| | | | |
|---|---|---|---|
| 0251120 | 1/1988 | European Pat. Off. | 534/761 |
| 2438496 | 2/1976 | Fed. Rep. of Germany | 534/761 |
| 2816629 | 10/1978 | Fed. Rep. of Germany | 534/757 |
| 2727114 | 12/1978 | Fed. Rep. of Germany | 534/757 |
| 7823988 | 3/1979 | France | 534/761 |
| 57-109860 | 7/1982 | Japan | 534/761 |
| 57-111356 | 7/1982 | Japan | 534/761 |
| 58-5363 | 1/1983 | Japan | 534/761 |
| 58-38757 | 3/1983 | Japan | 534/761 |
| 58-40352 | 3/1983 | Japan | 534/761 |
| 59-161462 | 9/1984 | Japan | 534/761 |
| 61-28556 | 2/1986 | Japan | 534/761 |
| 61-128556 | 2/1986 | Japan | 534/761 |
| 2099010 | 12/1982 | United Kingdom | 534/761 |

OTHER PUBLICATIONS

Sorokin, Chemical Abstracts, vol. 61, #8444 (1964).
6001 Chemical Abstracts 101 (1984) Nov., No. 20, Nov. 1984, p. 90 Abstract No. 173023s, Columbus, Ohio, U.S,; & JP-A-59 96 172.
Patent Abstract of Japan JP A 58 96655.
European Search Report EP 88 30 1051.

*Primary Examiner*—Floyd D. Hagel
*Attorney, Agent, or Firm*—Cushman, Darby & Cushman

[57] ABSTRACT

An azo compound of the formula:

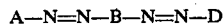

$$A-N=N-B-N=N-D$$

wherein:

A is (i) a phenyl group containing at least two unsaturated electron-withdrawing groups in ortho or para positions with respect to the azo link, (ii) an aromatic heterocycle, or (iii) the residue of an aromatic coupling component having a group displaceable by a diazotized aromatic amine;

B is an substituted or unsubstituted thien-2,5-ylene or thiazol-2,5-ylene group; and D is the residue of an aromatic coupling component having a group displaceable by a diazotized aromatic amine.

The azo compound has a significant absorption band extending into the near infra-red region of the spectrum and has utility in applications, such as solar screening, electronic, optical character recognition, printing, reprographic and security systems, where enhanced infra-red absorption is necessary or desirable.

5 Claims, No Drawings

AROMATIC DISAZO COMPOUNDS HAVING STRONG INFRA-RED ABSORPTION

This specification describes an invention relating to a disazo compound, especially such a compound which absorbs electromagnetic radiation in the near infra-red spectral region, i.e. from 700 to 1100 nanometers (nm).

According to a first aspect of the present invention there is provided an azo compound of the formula:

A—N=N—B—N=N—D   I wherein:
A is (i) a phenyl group containing at least two unsaturated electron-withdrawing groups in ortho or para positions with respect to the azo link, (ii) an aromatic heterocycle, or (iii) the residue of an aromatic coupling component having a group displaceable by a diazotised aromatic amine;
B is an optionally substituted thien-2,5-ylene or thiazol-2,5-ylene group; and
D is the residue of an aromatic coupling component having a group displaceable by a diazotised aromatic amine.

Where A is phenyl containing at least two unsaturated electron-withdrawing substituents (hereinafter called UEW groups), there are preferably 2 or 3 UEW which are preferably independently selected from $NO_2$, CN, CNS, 2,2-dicyanovinyl, 1,2,2-tricyanovinyl, $SO_2CF_3$, $COCOT$, $COT$, $SO_2T$, $COOT$, $SO_2OT$, $CONT_2$ $SO_2NT_2$ $OCOT$, $OSO_2T$ and $OCOOT$, in which each T is independently H; optionally substituted alkyl, especially $C_{1-4}$-alkyl; aryl, especially phenyl; or aralkyl, especially benzyl. In addition to the UEW groups, the phenyl group, A, may carry other substituents, preferably in the remaining ortho or para position, such as halogen, e.g. F, Cl & Br; $CF_3$; $C_{1-4}$-alkyl; O—$C_{1-4}$-alkyl; $C_{1-4}$-alkylene-O—$C_{1-4}$-alkyl; $NT_2$, OH, O—$C_{1-4}$-alkylene-O—$C_{1-4}$-alkyl, S—$C_{1-4}$-alkyl, $C_{1-4}$-haloalkyl and $C_{1-4}$-cyanoalkyl in which each T is as hereinbefore defined.

A preferred form of the first definition of A is a substituted phenyl group of the formula:

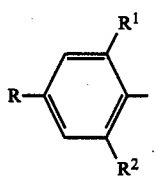   II wherein, two of R, $R^1$ & $R^2$ are independently selected from CN, $NO_2$, $SO_2CF_3$, 2,2-dicyanovinyl, 1,2,2-tricyanovinyl, COT, COCOT, $SO_2T$, $CONT_2$ and $SO_2NT_2$ and the third is chosen from H, OH, $C_{1-4}$-alkyl, O—$C_{1-4}$-alkyl, $NT_2$, halogen, especially Cl or Br; CN, $NO_2$, $CF_3$, COT, $SO_2T$, $CONT_2$ and $SO_2NT_2$; and each T is as hereinbefore defined. It is preferred that R and $R^1$ are each independently $NO_2$ or CN and that $R^2$ is selected from H, Cl, Br, $NO_2$, CN, $C_{1-4}$-alkoxy and $C_{1-4}$-alkyl.

Examples of substituted phenyl groups represented by A are:
2,4-dinitrophenyl, 2,4-dinitro-6-bromophenyl, 2,4-dicyanophenyl, 2,4-dinitro-6-cyanophenyl, 2-cyano-4-nitrophenyl, 2,4-dinitro-6-chlorophenyl, 2,4-dinitro-6-methoxyphenyl, 2,6-dicyano-4-nitrophenyl, 2,4-dicyano-6-chlorophenyl, 2-cyano-4-(ethoxycarbonyl)phenyl, 2,4-dicyano-6-bromophenyl, 2-nitro-4-(methoxycarbonyl)phenyl, 2-nitro-4-cyanophenyl, 2-nitro-4-thiocyanophenyl.

Where A represents an aromatic heterocycle this includes thienyl, thiazolyl, isothiazolyl, benzothiazolyl, benzoisothiazolyl, pyridyl, pyridoisothiazolyl, pyrazolyl, imidazolyl, triazolyl, especially thien-2-yl, isothiazol-5-yl, thiazol-2-yl, 1,3,4-thiadiazol-2-yl, 1,2,5-thiadiazol-2-yl, benzothiazol-2-yl, 2,1-benzoisothiazol-3-yl and pyrido[2,3-c]isothiazol-1-yl, each of which may carry nuclear substituents, such as those indicated above for A, where A is a phenyl group.

Such aromatic heterocycles, containing up to three hetero-atoms selected from nitrogen and sulphur, are preferably of the formulae:

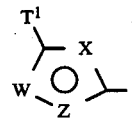   III wherein
Z is S, X is N, $^+N$—T or C—$T^2$ and W is N, $^+N$—T or C—$T^3$;
Z is N or $^+N$—T, X is S and W is N or $^+N$—T; or
Z is N—$T^4$, X is N, $^+N$—T or C—$T^2$ and W is N, $^+N$—T or C—$T^3$;
each T is as hereinbefore defined;
$T^1$, $T^2$ and $T^3$ are each independently selected from H, CN, SCN, $NO_2$, F, Cl, Br, $C_{1-4}$-alkyl, $C_{1-4}$-alkoxy, $C_{1-4}$-alkoxy-$C_{1-4}$-alkyl, $CF_3$, CHO, CN—$C_{1-4}$-alkyl, $SO_2CF_3$, COCOT, COT, $SO_2T$, COOT, $SO_2OT$, $CONT_2$, $SO_2NT_2$, OCOT, $OSO_2T$, OCOOT, COCl, COF, COBr, $SO_2Cl$, $SO_2F$ and $SO_2Br$;
or when X is C—$T^2$ or W is C—$T^3$,
$T^1$ and $T^3$ or $T^3$ together with the adjacent atoms to which they are attached form a benzene or pyridine ring, fused to the aromatic heterocycle
and $T^4$ is selected from H, $C_{1-4}$-alkyl, aryl, especially phenyl and aralkyl, especially benzyl.

In the heterocycle of Formula III it is especially preferred that one of the hetero-atoms, X and Z, is sulphur. When Z is N—$T^4$, it is preferred that one, and more preferably both, of X and W is nitrogen.

In the case of nitrogen-containing heterocycles in which the nitrogen atom is in a quaternised form, it is preferred that only one of W, X or Z is $^+N$—T. An example of such a quaternised heterocycle is N-substituted-benzothiazol-2-ylonium. In such heterocycles the N-substituent, T, is preferably $C_{1-4}$-alkyl, e.g. methyl; $C_{1-4}$-hydroxyalkyl, e.g. hydroxyethyl; aryl, e.g. phenyl, or aralkyl, e.g. benzyl.

The fused benzene or pyridine ring formed by $T^1$ and $T^2$ may carry one or two substituents selected from those listed above as alternative meaning for $T^1$, preferably in the meta positions with respect to the bridgehead carbon atoms.

Preferred substituents represented by $T^1$, $T^2$ and $T^3$ are $C_{1-4}$-alkyl, especially methyl and ethyl; CN—$C_{1-4}$-alkyl, especially cyanomethyl; CN; SCN; H; $NO_2$; $C_{1-4}$-alkoxycarbonyl and $C_{1-4}$-alkylaminocarbonyl.

Preferred substituents represented by $T^4$ are $C_{1-4}$-alkyl, especially methyl, phenyl and benzyl.

Specific examples of suitable heterocyclic groups, A, are: pyrazol-5-yl, thiophen-2-yl, imidazol-2-yl, isothiazol-5-yl, benzothiazol-2-yl, thiazol-2-yl, 1-methyl-1,3,4-triazol-5-yl, 3-methylthio-1,2,4-thiadiazol-5-yl 2,3-dicyanoimidazol-5-yl, 1-ethyl-3,4-dicyanopyrazol-5-yl, 5-nitrothiazol-2-yl, 1-ethyl-2,3-dicyanoimidazol-5-yl, 4-cyanoisothiazol-5-yl, 3-methyl-4-cyanoisothiazol-5-yl, 6-thiocyanobenzothiazol-2-yl, 6-fluorosulphonyl-benzothiazol-2-yl, 6-methoxybenzothiazol-2-yl, 6-methylsulphonylbenzothiazol-2-yl, 6-nitrobenzothiazol-2-yl, 5-nitro-2,1-benzoisothiazol-3-yl, 3,5-dinitrothien-2-yl, 6-cyanopyrido[2,3-c]isothiazol-1-yl pyrido[2,3-c]isothiazol-1-yl, 3-carboxy-5-nitrothien-2-yl, 3-formyl-5-nitrothien-2-yl, 3-cyano-5-nitrothien-2-yl, 3,5-dicyanothien-2-yl, 3-cyanomethyl-4-cyanopyrazol-5-yl, 2,1-benzisothiazol-3-yl, 2-ethylthio-1,3,4-thiadiazol-5-yl, 6-nitropyrido[2,3-c]isothiazol-1-yl, 3-methylsulphonyl-1,2,4-thiadiazol-5-yl, 1-cyanomethyl-3,4-dicyanopyrazol-5-yl, 1-cyanomethyl-2,3-dicyanoimidazol-5-yl, 1,3-di(cyanomethyl)-4-cyanopyrazol-5-yl, 5-nitro-7-bromo-2,1-benzoisothiazol-3-yl, 5-methyl-6-cyanopyrido[2,3-c]isothiazol-1-yl, 5-methoxy-6-cyanopyrido[2,3-c]isothiazol-1-yl, 3-methyl-6-methoxybenzothiazol-2-ylonium, 3-methyl-thiazol-2-ylonium, 2,3-dimethyl-4-cyanoisothiazol-5-ylonium, 1-methyl-2,1-benzoisothiazol-3-ylonium, 2,4-dimethyl-1,2,4-triazol-3-ylonium.

Where A is option (i) or (ii) as hereinbefore defined, the optionally substituted thien-2,5-ylene or thiazol-2,5-ylene group, B, is preferably derived from a 2-aminothiophene or 2-aminothiazole having a hydrogen atom or a group displaceable by a diazotised amine in the 5-position and optionally other substituents present in the 3 and/or 4 positions. Examples of suitable substituents for the 3 and 4 positions are those given above for options (i) and (ii) of A. Preferred substituents for the 4-position of both groups represented by B and $C_{1-4}$-alkyl, especially methyl; O—$C_{1-4}$-alkyl, especially methoxy; aryl, especially phenyl and nitrophenyl; COO—$C_{1-4}$-alkyl, especially methoxycarbonyl and ethoxycarbonyl; COO—$C_{1-4}$-alkylene-O-$C_{1-4}$-alkyl, especially 2-methoxyethoxycarbonyl; and halogen, especially chlorine and bromine. Preferred substituents for the 3-position of the thiophen-2,5-ylene group are CN; $NO_2$; $CONT_2$, $SO_2NT_2$, in which each T is as hereinbefore defined, and those given above for the 4-position.

A preferred thien-2,5-ylene group represented by B is of the formula:

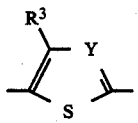

IV wherein
$R^3$ is H or $C_{1-4}$-alkyl;
Y is N or C—$R^4$;
$R^4$ is selected from H, CN, COT and $CONT_2$; and
each T is as hereinbefore defined.
In an especially preferred thienylene group of Formula IV, $R^3$ is H, Y is C—$R^4$ and $R^4$ is CN. Specific examples of suitable 2-aminothiophenes and 2-aminothiazoles from which B is derivable, when A is option (i) or (ii), are: 2-amino-3-cyanothiophene, 2-amino-3-(ethoxycarbonyl)thiophene, 2-aminothiazole, 2-amino-3-cyano-4-methylthiophene, 2-amino-4-methylthiazole, 2-amino-3-(dimethylaminocarbonyl)thiophene, 2-amino-3-acetylthiophene, 2-amino-3-(aminocarbonyl)thiophene.

Where A is the radical of an aromatic coupling component having a group displaceable by a diazotised aromatic or heteroaromatic amine, A and D may be the same or different and B is derivable from a tetrazotisable diamine of the formula $B(NH_2)_2$ wherein B is as hereinbefore defined. The amine groups in such a diamine are preferably located in the 2 and 5 positions on the thiophene and thiazole ring. Examples of suitable diamines are 2,5-diamino-3-cyanothiophene, 2,5-diamino-3-cyano-4-methylthiophene 2,5-diaminothiazole and 2,5-diamino-4-methylthiazole.

The radical of an aromatic coupling component, represented by A or D, is preferably derived from an aromatic coupling component of the formula, A—H or D—H, having a displaceable hydrogen atom. This may be an optionally substituted benzene, carbazole, naphthol, naphthylamine, arylamide, diaminopyridine, hydroxypyridinej, Michler's ethylene, monocyclicheteroaromatic amino or arylcycloheteroamine. Examples of such coupling components are mono- and di-N-substituted anilines, julolidines, N-substituted tetrahydroquinolines, naphthylamine- and naphtholamine-sulphonic acids, naphthol- sulphonic and carboxylic acids and derivatives thereof, aminothiophenes and aminothiazoles which may carry further nuclear substituents. Examples of such nuclear substituents are $C_{1-4}$-alkyl; O—$C_{1-4}$-alkyl; CONH—$C_{1-4}$-alkyl; NHCO—$C_{1-4}$alkyl; halogen, especially Cl and Br; cyano-$C_{1-4}$-alkyl; $C_{1-4}$-alkylene-COO—$C_{1-4}$-alkyl and $C_{1-4}$-alkylene-O—$C_{1-4}$-alkyl.

A suitable aniline represented by D—H or A—H is of the formula:

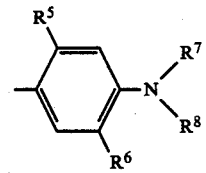

V wherein
$R^5$ is selected from H, $C_{1-4}$-alkyl, O—$C_{1-4}$-alkyl and NHCOT;
$R^6$ is selected from H, $C_{1-4}$-alkyl and O—$C_{1-4}$-alkyl; and
$R^7$ and $R^8$ are independently selected from H, $C_{1-4}$-alkyl, aryl, $C_{4-8}$-cycloalkyl and $C_{1-4}$-alkyl substituted by a group selected from OH, CN, aryl, OCO—$C_{1-4}$-alkyl, COO—$C_{1-4}$-alkyl, O—$C_{1-4}$-alkylene-O—$C_{1-4}$-alkyl, COO—$C_{1-4}$-alkylene-O—$C_{1-4}$-alkyl, halogen, CO—$C_{1-4}$-alkyl; O—$C_{1-4}$-alkyl and OCOO—$C_{1-4}$-alkyl.

The aryl group represented by or contained in $R^7$ and/or $R^8$ is preferably phenyl or phenyl substituted a group selected from the definitions of R, $R^1$ and $R^2$.

A suitable naphthylamine sulphonic acid represented by D—H or A—H is of the formula:

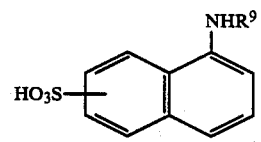

VI wherein $R^9$ is an aryl group, preferably phenyl or naphthyl which may be substituted by any of the groups represented by R, $R^1$ and $R^2$. The sulphonic acid group is preferably located in the 6 (1,6-Cleves acid), 7 (1,7-Cleves acid or 8 (Peri acid) positions with respect to the substituted amino group, $NHR^9$.

A suitable naphthol represented by D—H or A—H is of the formula:

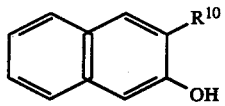
VII wherein
$R^{10}$ is selected from $SO_3T$, COOT, $CONT_2$ and $SO_2NT_2$; and
T is as hereinbefore defined.

A suitable Michlers ethylene coupling component represented by A—H or D—H is of the formula:

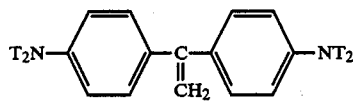
VIII wherein T is as hereinbefore defined. It is preferred that each T is the same and selected from $C_{1-4}$-alkyl, phenyl and benzyl.

A suitable arylamide represented by A—H or D—H is of the formula:

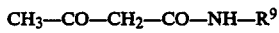
$$CH_3—CO—CH_2—CO—NH—R^9 \qquad IX$$

wherein $R^9$ is as hereinbefore defined.

A suitable monocyclic heteroaromatic amine coupling component is of the formula:

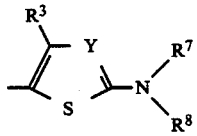
X wherein Y, $R^3$, $R^7$ and $R^8$ are as hereinbefore defined.

Specific examples of coupling components represented by A—H and D—H are: diphenylamine, carbazole, acetoacetanilide, Michler's ethylene, 2-aminothienyl, N,N-diethylaniline, N-n-butyl-N-ethylaniline, 2-hydroxy-3-carboxynaphthalene, 3-methoxy-N,N,diethylaniline, 3-methyl-N-n-butyl-N-ethylaniline, 3-methyl-N,N-diethylaniline, 3-methyl-N,N-di(n-propyl)aniline, 3-methoxy-N,N-diethylaniline, 3-acetylamino-N,N-diethylaniline, N-ethyl-N-cyanoethylaniline, 3-methyl-N-ethyl-N-benzylaniline, N,N-di(2-acetoxyethyl)aniline, 3-acetylamino-N,N-di(n-butyl)aniline, N,N-di(2-cyanoethyl)aniline, N-ethyl-N-(2-cyanoethyl)aniline, N,N-dimethylaminothienyl, 2-N,N-dimethylamino-1,3-thiazole, 3-methyl-N,N-di(2-acetoxyethyl)aniline, 3-acetylamino-N-ethyl-N-n-butylaniline, 2-hydroxy-3-(aminocarbonyl)naphthalene, 1-phenylaminonaphthalene-8-sulphonic acid, 2-methoxy-5-acetylamino-N,N-diethylaniline, 2-hydroxy-3-(phenylaminocarbonyl)naphthalene, 3-methoxy-N,N-di(2-[ethoxycarbonyl]ethyl)aniline, 3-methyl-N-n-butyl-N-(2-[ethoxycarbonyl]ethyl)aniline, 3-methyl-N-n-butyl-N-(3-[ethoxycarbonyl]propyl)aniline.

Examples of specific classes of compound of Formula I are given by the following formulae, XI to XIX.

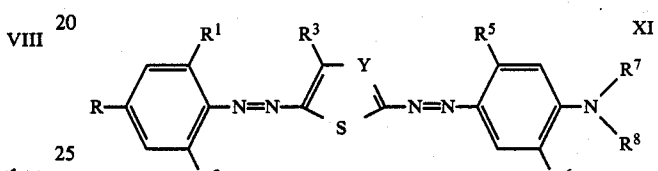
XI

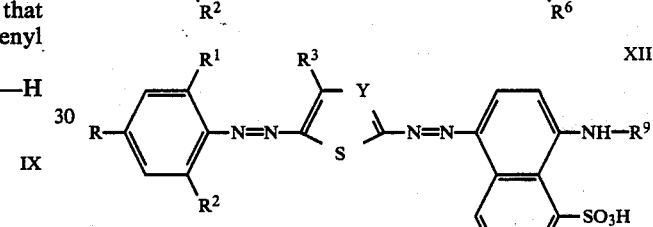
XII

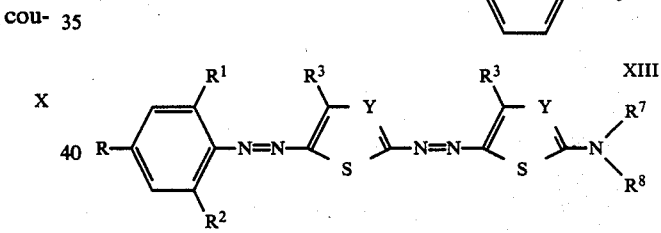
XIII wherein R, $R^1$, $R^2$, $R^3$, Y, $R^4$, $R^5$, $R^6$, $R^7$, $R^8$ and $R^9$ are as hereinbefore defined. In a preferred class of Formula XI, two of R, $R^1$ and $R^2$ are selected from CN, $NO_2$, $CF_3$, COT, $SO_2T$, $CONT_2$ and $SO_2NT_2$ and the third is H, Cl or Br; $R^3$ is H; Y is C—$R^4$, $R^4$ is CN, and $R^5$ is $C_{1-4}$-alkyl or NHCO—$C_{1-4}$-alkyl

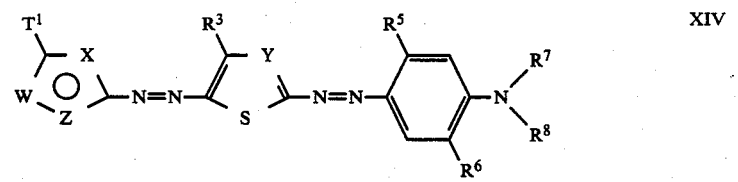
XIV

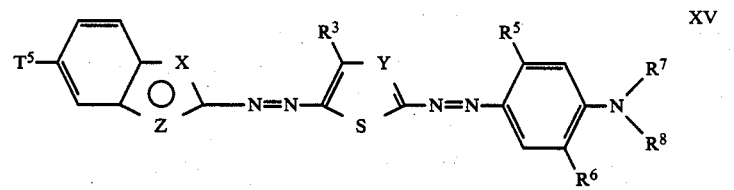
XV

-continued

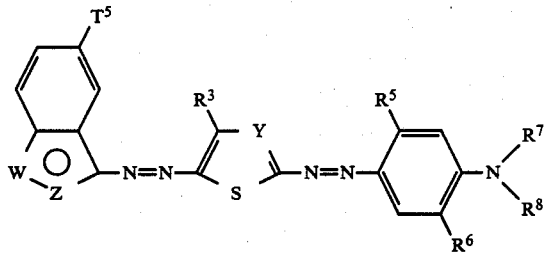
XVI

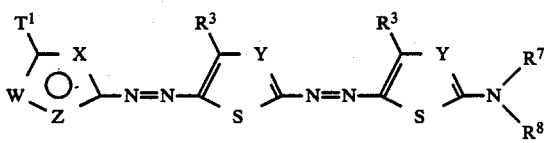
XVII wherein X, Y, Z, $T^1$, $R^3$, Y, $R^4$, $R^5$, $R^6$ and $R^7$ and $R^8$ are as hereinbefore defined. In a preferred class of Formula XIV, $T^1$ is H, W is C—$T^3$, X is C—$T^2$, $T^2$ and $T^3$ are $NO_2$ and Z is S. In a preferred class of Formulae XV and SVI Y, $R^5$, $R^6$, $R^7$ and $R^8$, C—CN, NHCOCH$_3$, H, $C_2H_5$ and $C_2H_5$ respectively and $T^5$ is $C_{1-4}$-alkyl, $C_{1-4}$-alkoxy or SCN.

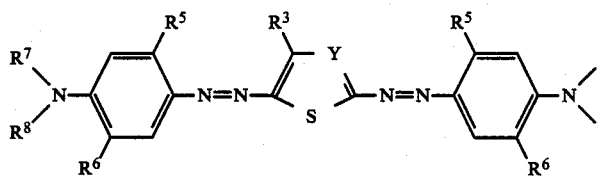
XVIII wherein $R^3$, Y, $R^5$, $R^6$, $R^7$ and $R^8$ are as hereinbefore defined. In the compound of Formula XVIII it is preferred that the two phenyl groups are identical.

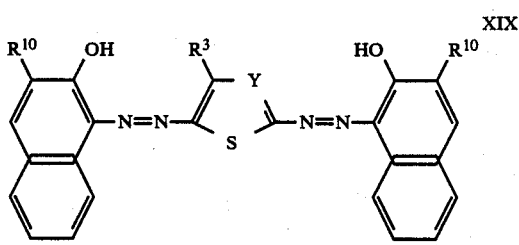
XIX wherein Y, $R^3$ and each $R^{10}$ are as hereinbefore defined. In the compound of Formula XIX, each $R^{10}$ is preferably identical and represents CONH—$C_{1-4}$-alkyl or CONH-phenyl.

Where any of W, X, Y and Z in Formulae XI to XIX is nitrogen this may be in a quaternised form, +N—T, as hereinbefore described.

The aryl group represented by or contained in $R^7$ and/or $R^8$ is preferably phenyl or substituted phenyl, suitable substituents being those given above for the phenyl group represented by A.

Specific examples of compounds of Formulae I and XI to XIX are:
3-acetamido-4-[3-cyano-5-(2-cyano-4-nitrophenylazo)-thien-2-yl-azo]-N,N-diethylaniline,
4-(4-methyl-5-[3,5-dinitrothien-2-ylazo]-thiazol-2-ylazo)-N,N-diethylaniline
2-(2-[2-acetamido-4-(N,N-diethylamino)phenylazo]-3-cyano-4-methylthienylazo)-3-methyl-6-methoxybenzoisothiazolium chloride
2,5-bis(2-hydroxy-3-[phenylaminocarbonyl]-naphth-1-ylazo)-3-cyanothiophene
2,5-bis(2-acetamido-4-[N,N-diethylamino]-phenylazo)-thiazole
1,1-bis(4-[N,N-diethylamino]phenyl)-2-(3-cyano-5-[2,4-dinitrophenylazo]-thien-2-ylazo)ethylene The disazo compound of Formula I can be prepared in a number of ways. Where A is a phenyl group or a heterocycle, as defined hereinbefore under options (i) and (ii) for A, the disazo compound can be prepared by:
(a) diazotising an amine, A—NH$_2$, coupling onto a heterocyclic amine having a displaceable hydrogen atom H—B—NH$_2$, diazotising the resulting monoazo compound A—N=N—B—NH$_2$, and coupling onto a compound D—H, having a displaceable hydrogen atom; or
(b) diazotising a heterocyclic amine having a displaceable hydrogen atom H—B—NH$_2$, coupling onto a compound D—H, having a displaceable hydrogen atom, and coupling the resulting monoazo compound H—B—N=N—D, onto a diazotised amine A—NH$_2$.

Where A is the radical of an aromatic coupling component having a group displaceable by a diazotised aromatic amine, as defined hereinbefore in option (iii) of A, the disazo compound may be prepared by diazotisation of a nitroaminoheterocycle $O_2N$—B—NH$_2$, coupling onto a compound D—H to form a monazo compound D—N=N—B—NO$_2$, reduction of the nitro group, diazotisation of the resultant amine, and coupling onto a compound A—H. Where A and D are identical the disazo compound can be made by tetraazotisation of a heterocyclic diamine B—(NH$_2$)$_2$ and coupling onto two equivalents of a compound D—H.

The disazo compounds of the present invention generally have a significant absorption band extending into the near infra-red region of the spectrum, i.e. from 700 to 1100 nm and therefore have utility in applications where it is necessary or desirable to absorb infra-red radiation. Examples of such uses are in solar screening, electronics, e.g. in wave guides etc and in a wide variety of laser-induced or lasser-scanning systems, such as printing, optical character recognition (OCR) and security systems. Certain of the compounds have utility as charge control agents (CCA) in electro-reprographic processes. Some of the compounds release electrons under the influence of electro-magnetic radiation and have utility as charge generator compounds (CGC) in electro-reprographic processes.

The invention is illustrated by the following Examples in which all parts and percentages are by weight unless otherwise indicated.

EXAMPLE 1

(a)

2-Amino-3-cyano-5-(2-cyano-4-nitrophenylazo)-thiophene (ACCT)

2-Cyano-4-nitroaniline (3.26 g; 0.02 mole) was stirred in glacial acetic acid (30 ml) and 100% sulphuric acid (15 ml) added, allowing the temperature to rise to 70° C. to dissolve the amine. The solution was cooled to <0° C. by means of external cooling and nitrosyl sulphuric acid (2.54 g; 0.02 mole) in 100% sulphuric acid (5 ml) was added dropwise over 15 minutes with stirring. The mixture was stirred for 3 hours in the presence of excess nitrous acid (as adjudged by blue colour with sulphone indicator). Excess nitrous acid was then destroyed by the addition of a solid sulphamic acid, to produce a solution of 2-cycano-4-nitrobenzene diazonium sulphate in sulphuric acid.

2-Amino-3-cyanothiophene (2.48 g; 0.02 mole) was dissolved in methanol (30 ml) and the solution filtered through carbon to remove insoluble material. The filtrate was rinsed into a beaker with further methanol to give a total volume of 75 ml and ice (50 g) was added. To this stirred solution was added, simultaneously over a period of 20 minutes, (i) the diazonium salt solution described above and (ii) a solution of sodium acetate trihydrate dissolved in the minimum amount of water, to maintain the pH at 3.5–4.5. Ice was added as necessary to maintain the temperature <5° C. and the final pH was 4.3. The mixture was stirred overnight, filtered, the cake washed with water (ca 500 ml) to pH 5–6 and dried at 60° C. in vacuum for 2 days.

The crude product (5.4 g) was recrystallised twice from 50:50 water:ethoxyethanol, incorporating a carbon screen give to ACCT (1.6 g, MP>320° C.) for which elemental analysis gave:

|  | C | H | N | S |
|---|---|---|---|---|
| % Theory | 48.3 | 2.0 | 28.2 | 10.7 |
| % Found | 49.1 | 2.3 | 27.6 | 10.0 |

This was purified further by column chromatography, with silica gel as the stationary phase and 9:1 toluene-ethyl acetate as eluent to yield ACCT (1.2 g, MP>320° C.).

WL$_{max}$: 513 nm, EC$_{max}$: 39,616 (in ethyl acetate).

Thin layer chromatography using ethyl acetate as eluent gave a single bluish-red spot (Rf: 0.7) and elemental analysis gave:

|  | C | H | N | S |
|---|---|---|---|---|
| % Theory | 48.3 | 2.0 | 28.2 | 10.7 |
| % Found | 48.6 | 2.1 | 28.0 | 10.3 |

(b)

3-Acetylamino-4-(3-cyano-5-[2-cyano-4-nitrophenylazo]thienylazo)-N,N-diethylaniline (ACCTD)

A nitrosyl sulphuric acid solution was prepared by adding sodium nitrite (0.22 g) to 100% sulphuric acid (6.72 g) at 10°–30° C. with stirring and heating to 65° C. to complete dissolution. The solution was cooled to <5° C. and water (1.54 ml) was added dropwise maintaining the temperature <20° C. Glacial acetic acid (1.18 g) was added and, after cooling to <0° C., followed by ACCT (0.75 g), in small portions. The mixture was stirred for 4 hours <0° C. to complete diazotisation and give ACCT-diazonium sulphate in sulpuric acid.

N,N-Diethyl-m-aminoacetanilide (1.03 g) was dissolved in 10% hydrochloric acid (25 ml) containing sulphamic acid (0.25 g). The ACCT-diazonium salt solution was added <5° C. and the mixture stirred for 2 hours and filtered. The cake was washed with water and air dried.

The crude product was purified by recrystallisation from 50:50 water:ethoxyethanol followed by column chromatography using silica gel and chloroform to give ACCTD (0.22 g, mp: 250°–5° C.).

WL$_{max}$: 706 nm, EC$_{max}$: 69,790 (in ethyl acetate).

Thin layer chromatography using chlorofororm as eluent gave a single dark green spot (Rf: 0.5). Elemental analysis gave:

|  | C | H | N | S |
|---|---|---|---|---|
| % Theory | 55.9 | 4.1 | 24.5 | 6.2 |
| % Found | 57.1 | 4.5 | 22.9 | 6.2 |

WL$_{max}$ is wavelength of absorption maximum
EC$_{max}$ is extinction coeeficient at absorption maximum Further dyes of Formulae XI to XVII can be made by the process of Example 1 by diazotising and coupling an amine, A—NH$_2$, onto an amine, H—B—NH$_2$, as described in Example I(a) to form a monoazo compound, A—N=N—B—NH$_2$ and diazotising this and coupling it onto a coupling component, H—D as described in Example I(b). The final dyes are purified as described in Example 1. The dyes are defined in the following tables by reference to the generic structures shown in Formulae II to X for the amines and coupling components and Formula XI to XVII for the final dyes.

TABLE 1

Dyes of Formulae XI to XIII

| Ex | Y | R | R$^1$ | R$^2$ | R$^3$ | R$^5$ | R$^6$ | R$^7$ | R$^8$ | R$^9$ | Form |
|---|---|---|---|---|---|---|---|---|---|---|---|
| 2 | C—CN | NO$_2$ | NO$_2$ | Br | H | NHAc | H | Et | Et | — | XI |
| 3 | N | NO$_2$ | CN | — | H | Me | H | Et | AcOE | — | XI |
| 4 | C—CN | CN | CN | H | H |  |  |  |  | Ph | XII |
| 5 | C—CN | NO$_2$ | CN | CN | H | NHAc | OMe | Et | Et | — | XI |
| 6 | C—CN | NO$_2$ | NO$_2$ | Br | H |  |  |  |  | Ph | XII |

TABLE 1-continued

Dyes of Formulae XI to XIII

| Ex | Y | R | R¹ | R² | R³ | R⁵ | R⁶ | R⁷ | R⁸ | R⁹ | Form |
|----|---|---|-----|-----|-----|-----|-----|-----|-----|-----|------|
| 7 | C—CN | NO₂ | NO₂ | Br | H | NHAc | OMe | Et | Et | — | XI |
| 8 | C—CN | NO₂ | NO₂ | Br | H | — | — | H | H | — | XIII |

TABLE II

Dyes of Formula XIV to XVII

| Ex | W | X | Y | Z | R³ | R⁵ | R⁶ | R⁷ | R⁸ | T¹/T⁵ | Form |
|----|---|---|---|---|----|----|----|----|----|-------|------|
| 9  | C—NO₂  | C—NO₂ | C—CN   | S     | H  | NHAc | H   | nBu | nBu   | H       | XIV |
| 10 | C—NO₂  | N     | C—CN   | S     | H  | Me   | Et  | Et  | H     | .       | XIV |
| 11 | —      | ⁺N—Me | C—CN   | S     | H  | NHAv | H   | Et  | Et    | H/OMe   | XV |
| 12 | —      | ⁺N—Me | N      | S     | Me | Me   | OMe | Et  | Et    | H/SCN   | XV |
| 13 | —      | ⁺N—Me | C—CN   | S     | H  | H    | H   | Et  | Et    | H/OMe   | XV |
| 14 | ⁺N—Me  | —     | C—CN   | S     | H  | NHAc | H   | Et  | Et    | H/H     | XVI |
| 15 | N      | —     | C—DMAC | S     | H  | Me   | H   | Et  | AcOE  | H/H     | XVI |
| 16 | N      | —     | C—CN   | S     | H  | NHAc | H   | Et  | Et    | H/NO₂   | XVI |
| 17 | C—H    | ⁺N—Me | C—CN   | S     | H  | NHAc | H   | Et  | Et    | H       | XIV |
| 18 | ⁺N—Me  | C—CN  | C—CN   | S     | H  | H    | H   | Et  | Et    | Me      | XIV |
| 19 | ⁺N—Me  | C—Br  | C—CN   | S     | H  | H    | H   | Et  | Et    | Me      | XIV |
| 20 | N      | C—CN  | C—CN   | S     | H  | NHAc | H   | Et  | Et    | Me      | XIV |
| 21 | ⁺N—Me  | N     | C—CN   | S     | H  | NHAc | H   | Et  | Et    | SMe     | XIV |
| 22 | N      | N     | C—CN   | S     | H  | NHAc | H   | Et  | Et    | SO₂Me   | XIV |
| 23 | N      | S     | C—CN   | ⁺N—Me | H  | NHAc | H   | Et  | Et    | H       | XIV |
| 24 | N      | ⁺N—Me | C—CN   | N—Me  | H  | NHAc | H   | Et  | Et    | H       | XIV |
| 25 | C—H    | ⁺N—Me | C—CN   | N—Me  | H  | Me   | H   | (EOCOEt) | | H    | XIV |
| 26 | N      | C—CN  | C—CN   | N—CyMe| H  | NHAc | H   | Et  | Et    | CN      | XIV |
| 27 | C—H    | C—CN  | C—CN   | S     | H  | —    | —   | H   | H     | H       | XVII |

Dyes of Formula XVIII and XIX and related structures can be made by tetra-azotising a diamine, B(NH₂)₂, in place of the 2-cyano-4-nitroaniline under the same conditions used in Example 1(a), except for the use of a double molar quantity of nitrosyl sulphuric acid and coupling the resulting tetra-azo compound under the conditions described in Example 1(b), except for use a double molar quantity of a coupling component, H—D, especially which D is of Formula V, VI, VII, VIII, IX or X, in place of the 3-(N,N-diethylamino)-acetanilide. Dyes of this type are shown in Table III.

TABLE III

| Ex | Y | R³ | R⁵ | R⁶ | R⁷ | R⁸ | R¹⁰ | Form |
|----|---|-----|------|----|----|----|-----|------|
| 28 | C—CN | H | NHAc | H | Et | Et | — | XVIII |
| 29 | C—CN | H | — | — | — | — | PhAC | XIX |
| 30 | N | H | — | — | — | — | PhAC | XIX |

In the dyes of Formula XI to XIX having a quaternised N atom, this is formed after the final coupling stage by reaction with at least one molar equivalent of dimethyl sulphate.

In Tables I, II and III the the symbols used have the following meaning:

| | |
|---|---|
| NHAc is —NHCOCH₃ | Et is ethyl |
| AcOE is —C₂H₄OCOCH₃ | Me is methyl |
| DMAC is —CON(CH₃)₂ | nBu is n-butyl |
| EOCOEt is —C₂H₄COOEt | Ph is phenyl |
| N—CyMe is N—CH₂CN | PhAC is —CONHPh |

I claim:

1. An azo compound of the formula:

A—N=N—B—N=N—D    (P)

wherein:
A is selected from:
(i) a substituted phenyl group of the formula:

wherein: two of R, R¹ and R² are independently selected from NO₂, CN, CNS, 2,2-dicyanovinyl, 1,2,2-tricyanovinyl, SO₂CF₃, COCOT, COT, SO₂T, CONT₂ and SO₂NT₂, and the third is chosen from H, OH, C₁₋₄-alkyl, O—C₁₋₄-alkyl, NT₂, Cl, Br, CN, NO₂, CF₃, COT, SO₂T, CONT₂ and SO₂NT₂

(ii) an aromatic heterocycle of the formula:

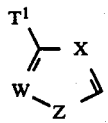

wherein:
Z is S, X is N, ⁺N—T or C—T² and W is N, ⁺N—T or C—T³

Z is N or ⁺N—T, X is S and W is N or ⁺N—T;

or Z is N—T⁴, X is N, ⁺N—T or C—T² and W is N, ⁺N—T or C—T³;

T¹, T² and T³ are each independently selected from H, CN, SCN, NO₂, F, Cl, Br, C₁₋₄-alkyl, C₁₋₄-alkoxy, C₁₋₄-alkoxy-C₁₋₄-alkyl, CF₃ CHO, CN—C₁₋₄-alkyl, SO₂CF₃, COCOT, COT, SO₂T, COOT, SO₂OT, CONT₂, SO₂NT₂, OCOT, OSO₂T, OCOOT, COCl, COF, COBr, SO₂Cl, SO₂F, SO₂Br;

or when X is C—T² or W is C—T³,
T¹ and T² or T³ together with the adjacent carbon atoms to which they are attached form a benzene or pyridine ring, fused to said aromatic heterocycle;

and T⁴ is selected from H, $C_{1-4}$-alkyl, phenyl and benzyl;

(iii) pyrid-2-yl;
(iv) isothiazol-3-yl
(v) 2,1-benzoisothiazol-3-yl;
(vi) a group of the formula:

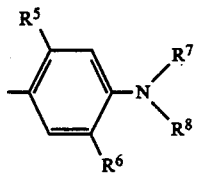

(vi)

wherein

R⁵ is selected from H, $C_{1-4}$-alkyl, O—$C_{1-4}$-alkyl and NHCOT;

R⁶ is selected from H, $C_{1-4}$-alkyl and O—$C_{1-4}$-alkyl; and

R⁷ and R⁸ are independently selected from H, $C_{1-4}$-alkyl, aryl, $C_{4-8}$-cycloalkyl and $C_{1-4}$-alkyl, substituted by a group selected from OH, aryl, O—$C_{1-4}$-alkylene-O—$C_{1-4}$-alkyl, halogen, and O—$C_{1-4}$-alkyl;

(vii) a substituted naphthylamine of the formula:

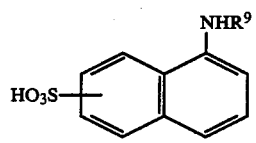

VII wherein R⁹ is phenyl or naphthyl either unsubstituted or substituted by a group selected from NO₂, CN, CNS, SO₂CF₃, COCOT, COT, SO₂T, CONT₂ and SO₂NT₂, and the third is chosen from H, OH, $C_{1-4}$-alkyl, O—$C_{1-4}$-alkyl, NT₂, Cl, Br, CN, NO₂, CF₃, COT, SO₂T, CONT₂ and SO₂NT₂;

(viii) a group of the formula:

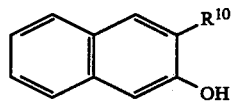

VIII wherein R¹⁰ is selected from SO₃T, COOT, CONT₂ and SO₂NT₂;

(ix) a group of the formula:

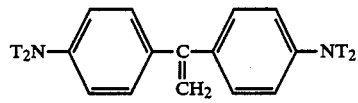

IX and (x) a group of the formula:

$$CH_3-CO-CH_2-CO-NH-R^9 \qquad X$$

wherein

R⁹ is phenyl or naphthyl either unsubstituted or substituted by a group selected from NO₂, CN, CNS, SO₂CF₃, COCOT, COT, SO₂T, CONT₂ and SO₂NT₂, OH, $C_{1-4}$-alkyl, O—$C_{1-4}$-alkyl, NT₂, Cl, Br and CF₃ each T is independently selected from H, $C_{1-4}$-alkyl, phenyl and benzyl;

B is 3-cyanothiophen-2,5-ylene;

D is selected from the groups defined as vi to x in the definition of A.

2. A compound according to claim 1 wherein A and D are independently selected from structures VI to X.

3. A compound according to claim 1 wherein R and R¹ are each independently NO₂ or CN.

4. A compound according to claim 1 wherein A is thien-2-yl, isothiazol-5-yl, thiazol-2-yl, 1,3,4-thiadiazol-2-yl, 1,2,5-thiadiazol-2-yl, benzothiazol-2-yl, 2,1-benzisothiazolyl or pyrido(2,3-c) isothiazol-1-yl.

5. The azo compound of the formula:

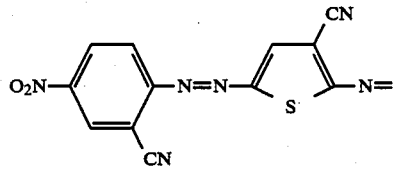

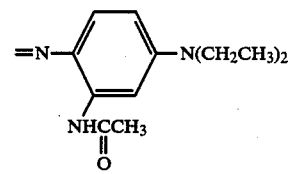

* * * * *